United States Patent [19]

Travaglio

[11] 3,744,381

[45] July 10, 1973

[54] PISTON ACTUATOR AND MOUNTING DEVICE THEREFOR

[75] Inventor: Dalny Travaglio, Kensington, Calif.

[73] Assignee: Universal Pneumatic Controls, Inc., Belmont, Calif.

[22] Filed: Sept. 1, 1971

[21] Appl. No.: 177,068

[52] U.S. Cl................................. 92/161, 248/300
[51] Int. Cl............................................ F01b 29/00
[58] Field of Search..................... 92/128, 161, 169, 92/146, 63, 64; 248/14, 25, 310, 361 R, 300, 117.6; 285/360, 361, 376; 138/30

[56] References Cited
UNITED STATES PATENTS

| 3,515,438 | 6/1970 | Stevenson et al. | 92/64 |
| 2,722,392 | 11/1955 | Talbot | 248/25 |
| 977,472 | 12/1910 | Pilkington | 285/360 |
| 3,538,950 | 11/1970 | Porteners | 285/376 |
| 3,334,545 | 8/1967 | Houser | 92/169 |
| 3,408,899 | 11/1968 | Golden | 92/169 |
| 1,431,662 | 10/1922 | Horning | 248/300 |
| 2,689,293 | 9/1954 | Claybourn | 248/300 |
| 1,455,026 | 5/1923 | Jorgensen et al. | 248/117.6 |
| 1,081,378 | 12/1913 | Freeman | 248/224 |

*Primary Examiner*—Manuel A. Antonakas
*Assistant Examiner*—R. H. Lazarus
*Attorney*—Owen, Nickersham & Erickson

[57] ABSTRACT

A piston actuator particularly adaptable for air conditioning systems and in combination therewith a mounting device that enables the actuator to be installed quickly without special tools or skilled labor. The mounting device is adaptable to be fixed to the outer wall of a duct at a particular preselected location with respect to a control shaft that is to be operated by the actuator. It includes portions for receiving and holding the actuator body and means for latching it firmly in its operating position.

5 Claims, 9 Drawing Figures

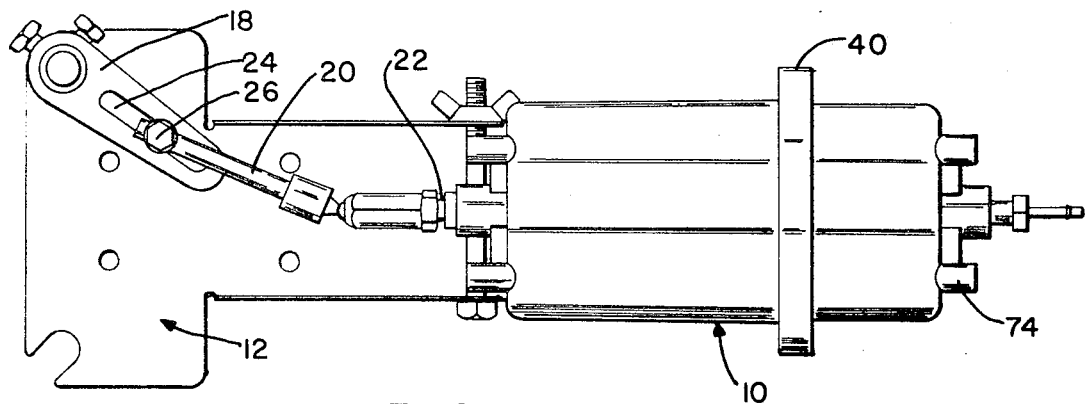
FIG_1
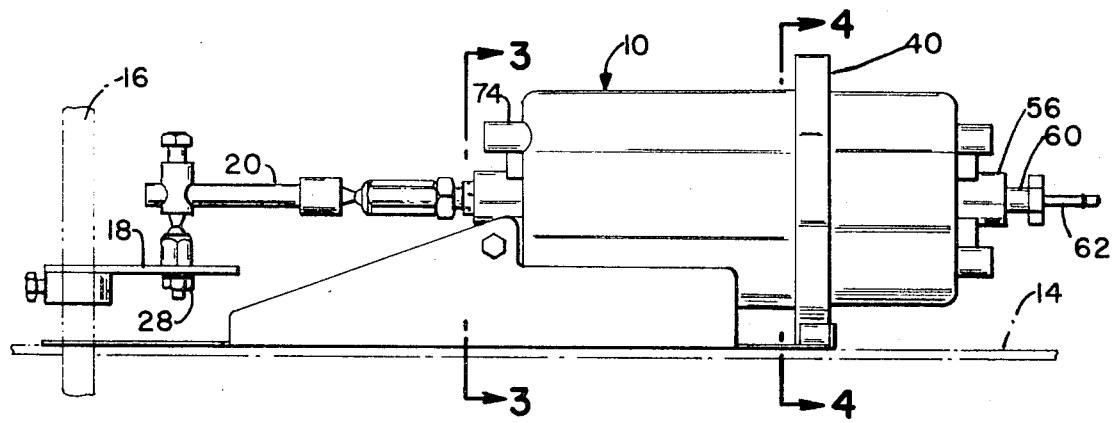
FIG_2
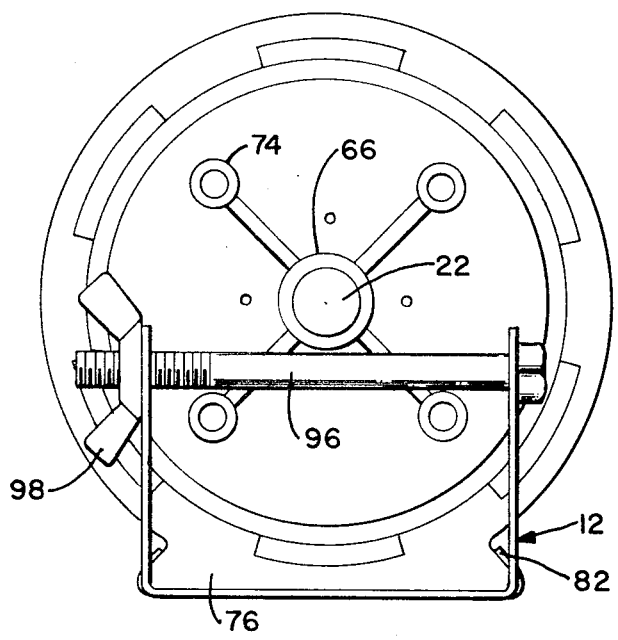
FIG_3
INVENTOR.
DALNY TRAVAGLIO
BY
Owen, Wickersham & Erickson
ATTORNEYS

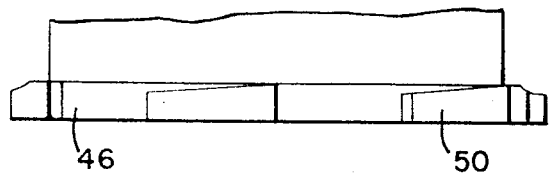
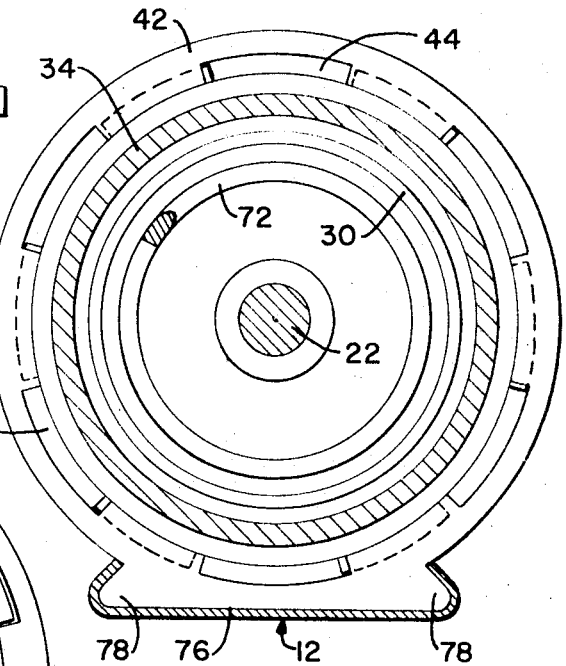
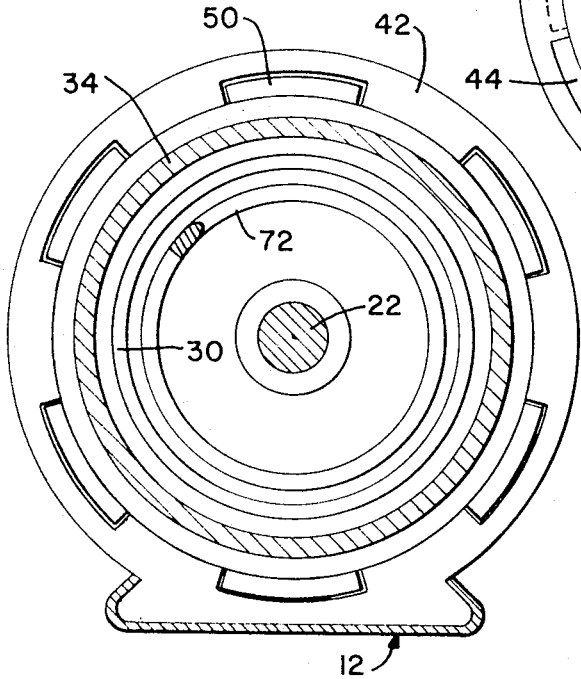
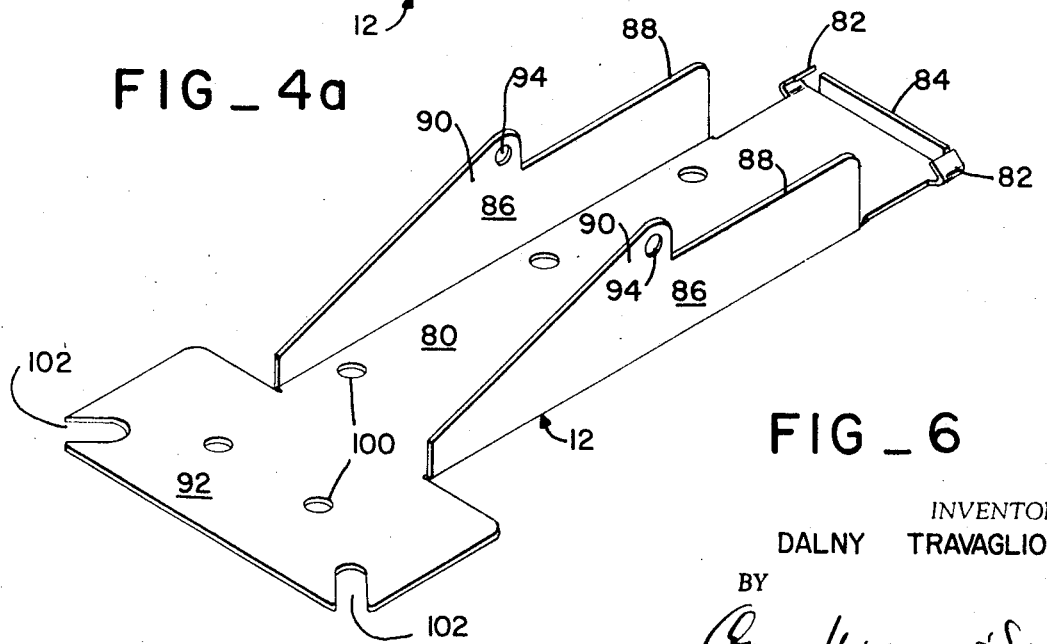

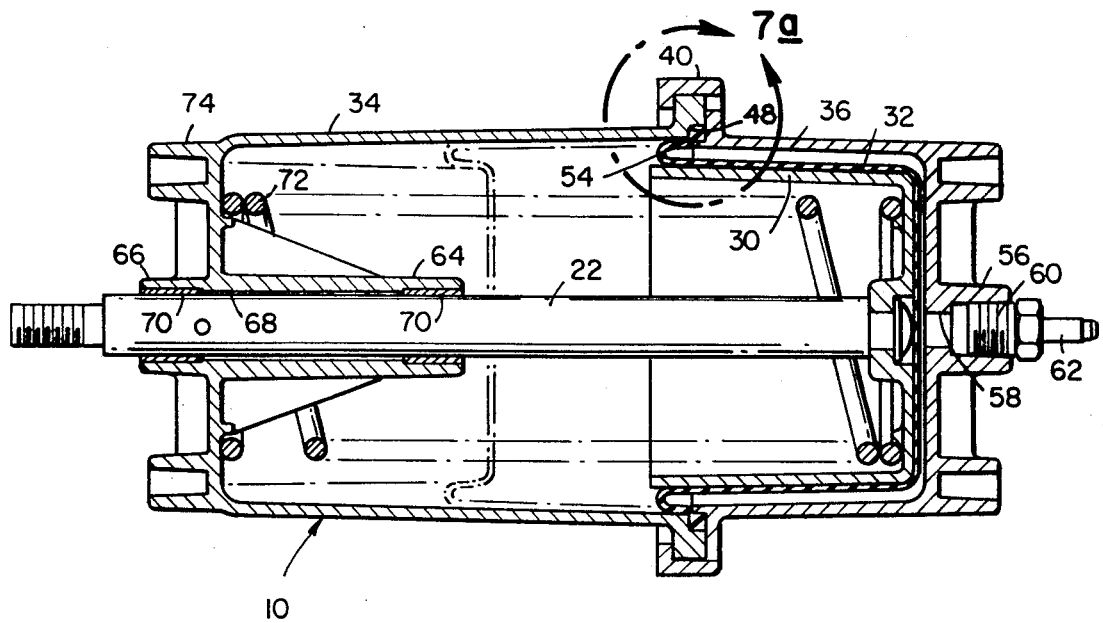
FIG_7
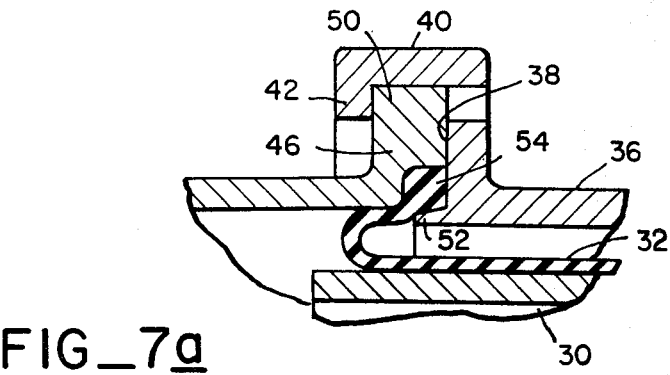
FIG_7a
INVENTOR.
DALNY TRAVAGLIO
BY
Owen, Wickersham & Erickson
ATTORNEYS

PISTON ACTUATOR AND MOUNTING DEVICE THEREFOR

This invention relates to an improved pneumatic actuator for use in air conditioning systems and more particularly a mounting device for the actuator that facilitates its installation at a precise preselected location.

Air conditioning systems, particulary for large buildings and the like, comprise extensive ducting utilizing numerous valves installed within the ducts at different locations to control the air circulations and flow rate. The opening and closing of these valves is accomplished by actuator devices which are usually pneumatically powered and controlled. Heretofore, the installation and mounting of these actuator devices was a laborious, time consuming and thus expensive process and also entailed other serious problems. For example, certain supports for actuator devices in the prior art tended to deflect in use or allowed the actuator to move during its operation, thereby causing improper alignment of the actuator shaft that resulted in poor action and also excessive wear of moving parts in the control linkage.

It is therefore an object of the present invention to provide an improved actuator and a mounting device therefor that solves the aforesaid problems.

A more specific object of the present invention is to provide an actuator and mounting device into which the actuator can be quickly and easily secured to or removed from without the need for tightening or loosening a large number of screw or bolt fasteners.

Another object of my invention is to provide a mounting device for a linear actuator that will hold the actuator firmly without any substantial deflection when the actuator shaft is extended so that it will not bind or wear excessively when manipulated.

Another object of my invention is to provide a mounting device for a linear actuator that is easily attachable to duct members either in a prefabrication shop or on the job site and which is readily located on the duct when being attached so as to retain the actuator in a precise position relative to the duct valve.

Yet another object of the present invention is to provide an improved actuator for air conditioning systems and a mounting device therefor, both of which are particularly well adapted for ease and economy of manufacture.

In general, the aforesaid objects are accomplished by a piston type actuator having a two part housing with an external mounting or retaining lug near one end of the hosing. This mounting lug is adapted to slide into cooperating engagement with a series of gripping members provided at one end of a mounting device that is attached by some convenient means to the outer surface of a duct wall adjacent the control rod of a duct valve. With the mounting or retaining lug secured by gripping members, the front of the actuator housing is situated between upright portions of the mounting device and is secured by an easily insertable cross pin. Thus, the actuator may be quickly installed or removed from the mounting device for replacement without the need for special tools or skilled and expensive labor. Moreover, in operation, the actuator is held firmly and fully supported so its shaft cannot deflect when extended aginst the force of the duct valve.

Other objects, advantages and features of my invention will become apparent from the following detailed description of one embodiment thereof presented in conjunction with the accompanying drawing, in which:

FIG. 1 is a plan view of an actuator and mounting device therefor embodying the principles of my invention;

FIG. 2 is a view in said elevation of the actuator and mounting device of FIG. 1;

FIG. 3 is an enlarged view in section taken along line 3—3 of FIG. 2;

FIG. 4 is an enlarged view in section taken along line 4—4 of FIG. 2 showing the housing sections of the actuator in the locked position;

FIG. 4a is a view similar to FIG. 4 showing the housing sections in the unlocked position;

FIG. 5 is a fragmentary end view showing the male locking end of one housing section;

FIG. 6 is a view in perspective of the mounting device for my actuator according to the present invention;

FIG. 7 is an enlarged view in elevation and in section of the actuator shown in FIGS. 1 – 5; and FIG. 7a is a further enlarged view in section of the locking joint for the actuator housing sections.

With reference to the drawing, FIGS. 1 and 2 show an actuator 10 secured in a mounting device 12 therefor as it appears in a typical installation attached to a wall surface 14 of a sheet metal air conditioning duct. The mounting device is located on the duct adjacent to a rotatable rod 16 (shown in phantom) which extends from an air flow control valve (not shown) within the duct. Fixed to the end of the valve rod 16 extending above the duct surface is a crank arm 18 to which is connected a link 20 pivotally attached as by a ball and socket joint to the end of a linearly extending shaft 22 for the actuator. The crank arm preferably has a slot 24 that receives an end fitting 26 on the link 20 having a bolt that fits in the slot. This fitting can be adjusted to any position within the slot and then tightened by a nut 28 so as to control the amount of crank arm movement by extension of the actuator shaft.

The actuator 10 produces a controlled linear extension and retraction of its shaft 22 which may be produced by any suitable mechanical means within the actuator. For most air conditioning systems, pneumatic actuators are used of the roll diaphragm type. Thus, as shown in FIG. 7, internally the shaft 22 may be connected to a piston 30 which is attached to a flexible diaphragm 32 that is fixed to the inner wall of the actuator. In accordance with the present invention the actuator has front and rear housing sections 34 and 36 that are joined together by a twist type locking means. The female section of this locking means on the rear housing section 36 is comprised of an integral projecting portion forming a radial shoulder 38 and connected to a generally cylindrical band-like portion 40. Extending radially inwardly from the edge of the band-like portion are a series of circumferentially spaced apart teeth 42 seprated by open spaces 44. These teeth are spaced axially from the radial shoulder 38 to form an annular space within the female locking means. The male section of the locking means on the end of the front housing section 34 is comprised of a peripheral lip portion 46 forming a circular shoulder 48 and having a series of circumferentially spaced apart and radially extending projections or teeth 50. In length, these male teeth are slightly shorter than the open spaces 44 of the female locking means and they have a thickness at one end equal to the distance between the shoulder 38 and the teeth 42 of the female locking means. As shown in FIG. 5, each male locking teeth 50 tapers in thickness in a clockwise direction. Thus, when the front and rear housing sections are joined together, the male teeth are easily moved axially into the spaces 44 of the female locking means and then twisted in a clockwise direction. When the male teeth are fully aligned with the female locking teeth 42 (FIG. 4) they are wedged tightly between them and the shoulder 38, thereby holding the two housing sections together. When the housing sections are to be separated the sections can be twisted counter-clockwise (FIG. 4a) and then moved axially apart.

The actuator housing sections 34 and 36 are generally cylindrical except for the integral end portions on each forming their locking means. Each housing section may be made from some suitable plastic such as a polycarbonate material by conventional injection molding techniques.

When the two housing sections of the actuator 10 are united with the male and female locking means together, as shown in FIGS. 7 and 7a, the circular shoulder 48 of the male locking means and an internal circular lip 52 on the open end of the rear housing section together form a circular cavity for retaining the edge bead 54 of the flexible diaphragm 32. This diaphragm extends over the piston 30 fixed to the shaft 22, thus providing an internal air seal between the front and rear housing sections as in conventional roll diaphragm actuators. At the closed end of the rear housing section 36 is an inlet boss 56 with a through passage 58 to which a fitting 60 can be attached for connecting an air line 62. At the closed end of the front housing section 34 is an internal boss portion 64 with an external portion 66, a central passage 68 and bushings 70 at opposite ends to support the shaft 22. A return spring 72 seated at one end around the base of the internal boss portion 64 and at its other end within the cup-shaped piston 30 normally urges the latter against the end of the rear housing section 36. A series of external boss portions 74 may be provided on the ends of both housing sections to facilitate the installation of the actuator in an end mounting position, if desired, or absolutely necessary for a particular application.

However, in accordance with my invention the actuator 10 is normally installed in a conveient manner by means of the mounting device 12, as will now be described. As shown in FIGS. 1 - 3, the band-like female locking means has a retainer lug portion 76 projecting from one side with a generally flat surface that is substantially tangential to the housing surface and a pair of tapered projections 78 at its opposite ends. These latter projections in cooperation with the mounting device 12 provide one means for quickly installing and firmly holding the actuator 10 in its proper position for operation. Turning to FIG. 6, the mounting device 12, as shown, has a flat central plate section 80 provided at one end with a pair of retaining members 82 that are bent upwardly at an angle from opposite sides of the plate. Along the end of the plate is a transverse stop member 84 that is bent upwardly thereform at approximately a right angle. Thus, the side retaining members 82 and the intermediate stop member 84 provide a space for receiving, with a fairly snug fit, the extended retainer portion 76 and its projections 78 thereby holding one end of the actuator in place on the mounting device. Along the sides of the mounting device are a pair of parallel, upright walls 86 of equal height. These upright walls have generally horizontal top edges 88 for a portion of their length so as to form a cradle-like support for the forward housing section of the actuator. At the ends of the top edges, the upright walls 86 extend upwardly to form tapered portions 90 that slope downwardly toward a wider front portion 92 of the mounting device. A pair of horizontally aligned holes 94 are provided in the tapered wall portions which are suitable for receiving a cross bolt 96. As shown in FIG. 3, this bolt can be a standard machine bolt, preferably provided with a wing nut 98 to facilitate hand tightening.

When the actuator 10 is placed on the mounting device 12 with its mounting portion 76 gripped between the retaining members 82 and against the stop member 84 the cross bolt 96 extends just under the shaft supporting boss 66 on the forward housing section 36. When thus installed, the actuator is held firmly and is well supported in that it cannot move and the mounting device 12 will not deflect when the actuator shaft is extended. The stop member and cross bolt prevent any appreciable axial displacement of the actuator while the upright portions of the mounting device provide a firm support for the forward housing sections. Yet, the initial installation of the actuator on the mounting device 12 or its removal from it for replacement, entails only the insertion of the actuator mounting portion 76 into position between the retainer tabs and against the stop member and the subsequent insertion of the bolt member.

In practice, the mounting device has a further advantage of being adaptable for attachment to a duct by welding or other means either in the shape or on the job site in the field. If the latter is preferred, a series of holes 100 are provided to receive standard sheet metal screws for holding the mounting device in place. On each outer corner of the forward portion 92 of the mounting plate 12 is a slot or cutout 102 that extends inwardly and has a curved inner edge. These slots are located off center from the centerline of the actuator shaft 22 so that when placed in engagement with the operating rod 16 of a duct valve in a standard air conditioning system they will automatically position the actuator 10 so that its shaft and attached linkage can be connected to the valve rod to provide proper operation.

In addition to its functional versatility the mounting device 12 can be made with ease and economy by forming it from a relatively light, single piece of sheet metal such as 16 gauge sheet steel or the equivalent. This affords the mounting device with sufficient strength and rigidity while still allowing some flexbility in the side walls. When the actuator is mounted in place on the device 12 the bolt 96 can be taken up an amount sufficient to bring the top edges of the side walls 86 into firm supporting engagement with the forward housing section 34. Since the bolt also holds the actuator against the stop member 84 and prevents axial movement, the actuator is firmly held in place and cannot deflect when operated. One important result of this in an air conditioning system is that it prevents any "oilcan" noises of the duct as the actuator is operated.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In combination, a mounting device and an elongated cylindrical housing having an axially movable actuator therein, said housing having an integrally connected ring member of larger diameter thereabout intermediate its ends, a peripheral portion of said ring member being radially enlarged and having side walls which extend from the housing in a direction to provide outwardly open recesses, the mounting device comprising an elongated plate member for sealing the enlarged portion and provided adjacent the rear end thereof with a transversely extending, upwardly projecting stop member for abutting the rearwardly facing surface of the enlarged portion of the ring member, a pair of laterally spaced retaining devices on the plate member forwardly of the stop member for extending into the recesses in the side walls of the enlarged portion, a pair of walls projecting upwardly from the plate member which are laterally spaced from each other less than the diameter of the housing and of a height to engage the surface thereof on opposite sides of its axis for supporting it, and means on said plate member for removably supporting a transversely extending element bearing against the forward end of the housing for retaining the enlarged portion against the stop member.

2. A mounting device according to claim 1 wherein the actuator housing is comprised of front and rear sections provided with a pair of interlocking members integrally connected to the respective ends of the sections, said ring member comprising the outer periphery of one of the interlocking members.

3. A mounting device according to claim 2 wherein the pair of interlocking members constitute respective male and female devices, said ring member being the outer periphery of the female device.

4. A mounting device according to claim 3 wherein the male device comprises a plurality of angularly spaced teeth extending radially from the open end of the other section, the female device includes a plurality of angularly spaced teeth extending radially inward from the ring member and spaced outwardly from the end of the one section, the spacing between the teeth of the female device being such as to pass the teeth of the male device therethrough.

5. A mounting device according to claim 1 wherein the actuator within the housing is provided with an operator movable outwardly of the forward end of the housing when the actuator is energized.

* * * * *